United States Patent
Liu et al.

(10) Patent No.: US 8,530,609 B2
(45) Date of Patent: Sep. 10, 2013

(54) PROCESS FOR REMOVING METAL SPECIES IN THE PRESENCE OF HYDROGEN AND A POROUS MATERIAL AND POLYESTER POLYMER CONTAINING REDUCED AMOUNTS OF METAL SPECIES

(75) Inventors: Zhufang Liu, Kingsport, TN (US); Jeff Scott Howell, Johnson City, TN (US)

(73) Assignee: Grupo Petrotemex, S.A. de C.V., San Pedro Garza Garcia (MX)

( * ) Notice: Subject to any disclaimer, the term of this patent is extended or adjusted under 35 U.S.C. 154(b) by 563 days.

(21) Appl. No.: 12/104,514

(22) Filed: Apr. 17, 2008

(65) Prior Publication Data

US 2008/0194750 A1    Aug. 14, 2008

Related U.S. Application Data

(62) Division of application No. 11/151,084, filed on Jun. 13, 2005, now Pat. No. 7,390,869.

(51) Int. Cl.
*C08G 63/00* (2006.01)

(52) U.S. Cl.
USPC ........... 528/280; 528/272; 528/279; 528/281; 528/283; 528/285; 528/308.1; 502/102; 502/103

(58) Field of Classification Search
USPC ................. 528/272, 279, 283, 285, 271, 280, 528/281, 308.1; 502/102, 103
See application file for complete search history.

(56) References Cited

U.S. PATENT DOCUMENTS

| | | | |
|---|---|---|---|
| 3,487,100 A | 12/1969 | Arai et al. | |
| 3,497,477 A | 2/1970 | Barkley et al. | |
| 3,501,420 A | 3/1970 | Stevenson | |
| 3,647,362 A | 3/1972 | Head et al. | |
| 3,666,791 A | 5/1972 | Chikawa et al. | |
| 3,803,003 A | 4/1974 | Matsuzawa et al. | |
| 4,076,946 A | 2/1978 | Millick, III | |
| 4,407,733 A | 10/1983 | Birkenstock et al. | |

(Continued)

FOREIGN PATENT DOCUMENTS

| | | |
|---|---|---|
| EP | 0172280 | 2/1986 |
| EP | 942070 | 9/1999 |

(Continued)

OTHER PUBLICATIONS

Modern Polyesters.Chapter II. 2003.*

(Continued)

*Primary Examiner* — Frances Tischler
(74) *Attorney, Agent, or Firm* — Oblon, Spivak, McClelland, Maier & Neustadt, L.L.P.

(57) ABSTRACT

A process for removing metal species from a composition comprising contacting:
 a. an oligomer mixture stream comprising the monomers of a partially aromatic polyester polymer and at least one metal species, or
 b. a molten polyester polymer stream comprising partially aromatic polyester polymers and at least one metal species, with a non-catalytic porous material in the presence of hydrogen to produce a treated stream containing a reduced amount of at least one metal species. There are provided compositions comprising a partially aromatic polyester polymer having an It.V. of at least 0.50 produced in a direct esterification melt phase process, from greater than 0 to less than 50 ppm antimony, and less than 40 ppm cobalt, or produced in an ester exchange melt phase process, having from greater than zero to less than 5 ppm titanium and less than 10 ppm manganese.

27 Claims, 3 Drawing Sheets

(56) References Cited

U.S. PATENT DOCUMENTS

| | | | |
|---|---|---|---|
| 4,506,091 A | 3/1985 | Deardorff | |
| 4,536,482 A | 8/1985 | Carcia | |
| 4,609,634 A | 9/1986 | King, Jr. | |
| 4,701,436 A | 10/1987 | Wang et al. | |
| 4,774,221 A | 9/1988 | Medem et al. | |
| 4,803,295 A | 2/1989 | Stautzenberger et al. | |
| 4,914,070 A | 4/1990 | Ledoux et al. | |
| 5,242,645 A * | 9/1993 | Sasamoto et al. | 264/210.8 |
| 5,391,524 A | 2/1995 | Ledoux et al. | |
| 5,545,746 A | 8/1996 | Benzaria et al. | |
| 5,550,264 A | 8/1996 | Elsasser | |
| 5,852,088 A | 12/1998 | Dismukes et al. | |
| 5,872,284 A | 2/1999 | Iwasaki et al. | |
| 5,936,126 A | 8/1999 | Ruhl et al. | |
| 5,958,831 A | 9/1999 | Prin et al. | |
| 5,989,648 A | 11/1999 | Phillips | |
| 6,100,374 A | 8/2000 | Iwasaki et al. | |
| 6,180,559 B1 | 1/2001 | Roberts et al. | |
| 6,207,128 B1 | 3/2001 | Sellin et al. | |
| 6,217,841 B1 | 4/2001 | Grindatto et al. | |
| 6,380,352 B1 | 4/2002 | Sumner, Jr. et al. | |
| 6,514,897 B1 | 2/2003 | Moy et al. | |
| 6,787,630 B1 * | 9/2004 | Dominguez De Walter | 528/279 |
| 6,790,806 B2 | 9/2004 | Hesse et al. | |
| 7,160,838 B1 | 1/2007 | Prin et al. | |
| 2001/0048970 A1 | 12/2001 | Hagemeyer et al. | |
| 2002/0121460 A1 | 9/2002 | Moy et al. | |
| 2002/0145226 A1 | 10/2002 | Hesse et al. | |
| 2003/0004054 A1 | 1/2003 | Ito et al. | |
| 2003/0045673 A1 * | 3/2003 | Nakajima et al. | 528/282 |
| 2005/0215753 A1 * | 9/2005 | Otto et al. | 528/272 |

FOREIGN PATENT DOCUMENTS

| | | |
|---|---|---|
| EP | 1050339 | 11/2000 |
| GB | 1454690 | 11/1976 |
| GB | 2068942 | 8/1981 |
| JP | 69020455 | 9/1969 |
| JP | 70017427 | 6/1970 |
| JP | 47025335 | 7/1972 |
| JP | 47044208 | 11/1972 |
| JP | 48000438 | 1/1973 |
| JP | 48036141 | 5/1973 |
| JP | 48061445 | 8/1973 |
| JP | 50142537 | 11/1975 |
| JP | 54063038 | 5/1979 |
| JP | 2180853 | 7/1990 |
| JP | 3264553 | 11/1991 |
| JP | 7227710 | 8/1995 |
| JP | 1995258588 | 10/1995 |
| JP | 1995308507 | 11/1995 |
| JP | 1997173833 | 7/1997 |
| JP | 200034343 | 2/2000 |
| WO | WO 94/16817 | 8/1994 |
| WO | WO 96/02618 | 2/1996 |
| WO | WO 02/12380 | 2/2002 |

OTHER PUBLICATIONS

Kruger, Reisener, Reuter, Richter, Metallurgy, Institut fur Metallbuttenwesen und Elektrometallurgie, Rheinisch-Estfalische Technische Hochshule Aachen, Federal Republic of Germany, pp. 375-387, vol. A16.

Biskup, Subotic, Removal of Heavy-Metal Ions from Solutions by Means of Zeolites.II. Thermodynamics of the Exchange Processes Between Zinc and Lead Ions from Solutions and Sodium Ions from Zeolite A, Separation Science and Technology, 2000, pp. 2311-2326, 35(14), Marcel Dekker, Inc.

Valverde, Lucas, Gonzalez, Rodriguez, Equilibrium Data for the Exchange of $Cu^{2+}$, $Cd^{2+}$, and $Zn^{2+}$ Ions for H+ on the Cationic Exchanger Amberlite IR-120, J. Chem. Eng. Data, 2002, pp. 613-617, issue 47, American Chemical Society on the web.

Streat, Adsorption of Trace Metals on Modified Activated Carbons, Dept. of Chemical Engineering, Loughborough University of Technology, pp. 264-271.

Vernon, Metal separation by chelating ion exchange, Acta Polymerica 30, 1979, pp. 740-743, University of Salford, Dept. of Chemistry and Applied Chemistry, Salford M5 4WT, Lane, (U.K.).

Waitz, Jr., Ion Exchange for Recovery of Precious Metals, Plating and Surface Finishing, 1982, pp. 56-59.

Co-pending U.S. Appl. No. 11/151,085, filed Jun. 13, 2005.

Office Action dated Aug. 12, 2005, concerning co-pending U.S. Appl. No. 11/151,085, filed Jun. 13, 2005.

Notice of Allowance dated Feb. 28, 2006 from co-pending U.S. Appl. No. 11/151,085—now issued as USP 7,067,615.

Supplemental Notice of Allowance dated Apr. 21, 2006 from co-pending U.S. Appl. No. 11/151,085—now issued as USP 7,067,615.

Office Action dated Oct. 2, 2007 from original U.S. Appl. No. 11/151,084.

Notice of Allowance dated Mar. 19, 2008 from original U.S. Appl. No. 11/151,084.

* cited by examiner

US 8,530,609 B2

PROCESS FOR REMOVING METAL SPECIES IN THE PRESENCE OF HYDROGEN AND A POROUS MATERIAL AND POLYESTER POLYMER CONTAINING REDUCED AMOUNTS OF METAL SPECIES

1. CROSS REFERENCES TO RELATED APPLICATIONS

This application is a divisional of U.S. application Ser. No. 11/151,084, filed Jun. 13, 2005, fully incorporated herein by reference.

2. FIELD OF THE INVENTION

This invention pertains to polyester polymer and processes for the manufacture thereof, and in particular to processes for the production of polyester polymers having a reduced amount of metal species by contacting oligomer mixtures and/or polyester polymers in a melt phase with a non-catalytic porous material in the presence of hydrogen, and to polyester polymers having reduced amounts of metal species.

3. BACKGROUND OF THE INVENTION

Metal species such as metallic ions or elemental metallic residues can cause problems in many industrial chemical processes. For example, metal ions or elemental metallic residues present in a reaction feed may deactivate a catalyst; and metal ions in electronic cleaning solvents may lead the electronic devices to malfunction. In the manufacture of polyester polymers, the presence of metal particles added as catalysts can cause packaging made from these polymers to appear hazy, yellow in color, and often continue to be catalytically active thereby contributing to the formation of acetaldehyde and other color bodies.

Ion-exchange resins are widely used to remove metal ions. Since these resins are made of organic polymers, and are usually used at ambient temperature or slightly above the ambient temperature. Zeolites and activated carbon are widely used as adsorbent for purification or separation. Activated carbon can be used to purify water by absorbing alkaline earth metal ions; zeolite A can remove moisture by acting a desiccant. However, little is known on how to remove metal ions or elemental metallic residues from a system that is highly viscous or from solid solutions at ambient temperature or at slightly higher temperature.

We have discovered that it is desirable to remove metal species in the melt phase reaction for the production of polyester polymers. The continual catalytic effects of some metals have been dealt with by the addition of various catalyst deactivators or thermal stabilizers. Some stabilizers, especially those of the phosphorous acid or esters of various phosphorous compounds are added in quantities which reduce a metal such as antimony to its elemental state, which can contribute to the darkening of the polymer if large amounts of the antimony have to be reduced. It would also be desirable to recover some of these metals as they may no longer significantly contribute to further advantages downstream once their function as polymerization and/or esterification catalysts has concluded.

4. BRIEF DESCRIPTION OF THE INVENTION

There is now provided a process for removing metal species from a composition comprising contacting:

a. an oligomer mixture stream comprising the monomers of a partially aromatic polyester polymer and at least one metal species, or b. a molten polyester polymer stream comprising partially aromatic polyester polymers and at least one metal species, with a non-catalytic porous material in the presence of hydrogen to produce a treated stream containing a reduced amount of at least one metal species.

There is also provided a composition comprising a partially aromatic polyester polymer having an It.V. of at least 0.50 produced in a direct esterification melt phase process, from greater than 0 to less than 50 ppm antimony, and less than 40 ppm cobalt.

There is also provided a composition comprising partially aromatic polyester polymers having an It.V. of at least 0.50 produced in an ester exchange melt phase process, from greater than zero to less than 5 ppm titanium, and less than 10 ppm manganese.

5. BRIEF DESCRIPTION OF THE DRAWINGS

6. DETAILED DESCRIPTION OF THE INVENTION

Figure 1:
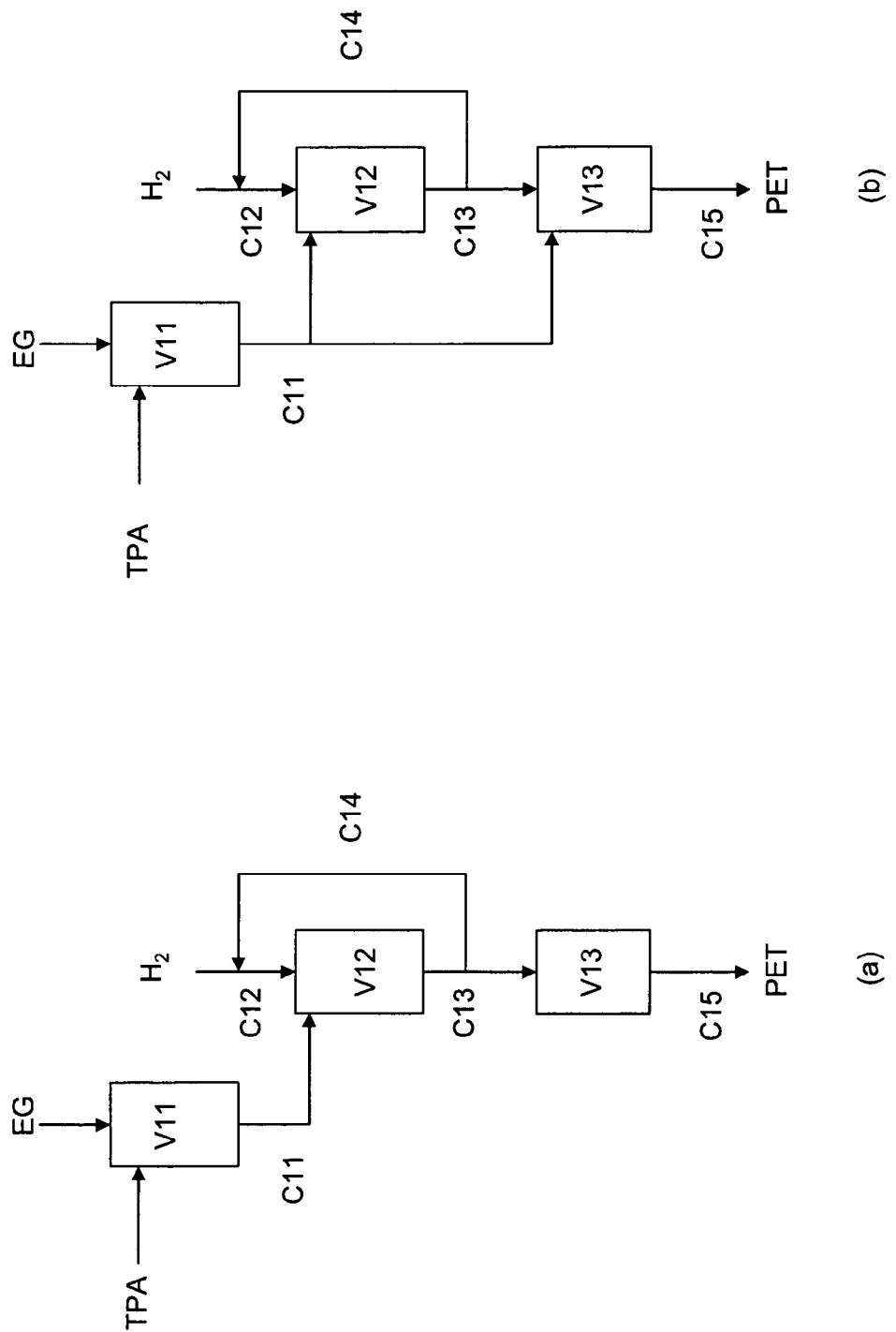
FIG. 1a is a process flow diagram illustrating a dedicated stand alone vessel containing porous particles receiving a feed of oligomer mixture.
FIG. 1b illustrates that esterification products may be split into two streams; one oligomer stream is taken as a side draw and introduced for hydrotreating and the other stream introduced directly into a polycondensation zone.

The present invention may be understood more readily by reference to the following detailed description of the invention. It is to be understood that this invention is not limited to the specific processes and conditions described, as specific processes and/or process conditions for processing plastic articles as such may, of course, vary.

It must also be noted that, as used in the specification and the appended claims, the singular forms "a", "an" and "the" include plural referents. References to a composition containing "an" ingredient or "a" polymer is intended to include other ingredients or other polymers, respectively, in addition to the one named.

Ranges may be expressed herein as "within" or "between" or from one value to another. In each case, the end points are included in the range. Ranges expressed as being greater than or less than a value exclude the end point(s).

By "comprising" or "containing" or "having" is meant that at least the named compound, element, particle, or method step etc must be present in the composition or article or method, but does not exclude the presence of other compounds, materials, particles, method steps, etc, even if the other such compounds, material, particles, method steps etc. have the same function as what is named.

It is also to be understood that the mention of one or more method steps does not preclude the presence of additional method steps or intervening method steps between those steps expressly identified.

The It.V. values described throughout this description are set forth in dL/g units as calculated from the inherent viscosity measured at 25° C. in 60/40 wt/wt phenol/tetrachloroethane. The inherent viscosity is calculated from the measured solution viscosity. The following equations describe such solution viscosity measurements and subsequent calculations to Ih.V. and from Ih.V. to It.V:

$$\eta_{inh} = [\ln(t_s/t_o)]/C$$

where $\eta_{inh}$=Inherent viscosity at 25° C. at a polymer concentration of 0.50 g/100 mL of 60% phenol and 40% 1,1,2,2-tetrachloroethane
ln=Natural logarithm
$t_s$=Sample flow time through a capillary tube
$t_o$=Solvent-blank flow time through a capillary tube
C=Concentration of polymer in grams per 100 mL of solvent (0.50%)

The intrinsic viscosity is the limiting value at infinite dilution of the specific viscosity of a polymer. It is defined by the following equation:

$$\eta_{int} = \lim_{C \to 0} (\eta_{sp}/C) = \lim_{C \to 0} \ln(\eta_r/C)$$

where $\eta_{int}$=Intrinsic viscosity
$\eta_r$=Relative viscosity=$t_s/t_o$
$\eta_{sp}$=Specific viscosity=$\eta_r - 1$ Instrument calibration involves replicate testing of a standard reference material and then applying appropriate mathematical equations to produce the "accepted" I.V. values.

Calibration Factor=Accepted IV of Reference Material/Average of Replicate Determinations Corrected IhV=Calculated IhV×Calibration Factor The intrinsic viscosity (ItV or $\eta_{int}$) may be estimated using the Billmeyer equation as follows:

$$\eta_{int} = 0.5[e^{0.5 \times Corrected\ IhV} - 1] + (0.75 \times Corrected\ IhV)$$

In one aspect of the invention, there is provided a process for removing metal species from a composition comprising contacting:
  a. an oligomer mixture stream comprising the monomers of a partially aromatic polyester polymer and at least one metal species, or
  b. a molten polyester polymer stream comprising partially aromatic polyester polymers and at least one metal species,
with a non-catalytic porous material in the presence of hydrogen to produce a treated stream containing a reduced amount of at least one metal species.

Either an oligomer mixture or a molten polyester polymer stream contacts a fixed bed or a slurry of non-catalytic porous material. The oligomer mixture is produced by esterifying reactants in an esterification zone in the presence of metal species to form an oligomer mixture comprising the monomers used as the repeating unit residues in the partially aromatic polyester polymer made in the polycondensation zone, and at least one metal species. Examples of monomers used as the repeating unit residues in a polyester polymer include bis-hydroxyalkylterephthalate monomers or bis-hydroxyalkylnaphthalate monomers. An example of a common monomer is bis-hydroxyethylterephthalate (BHET). The oligomer mixture may contain condensed monomers forming oligomers having 2 to less than 7 repeating units, such that the average number of repeat units may range from 0.8 to less than 7.0. The esterification reaction can be a direct esterification process or an ester exchange process. The metal species in the oligomer mixture may be present due to the addition of catalysts in an ester exchange reaction, or due to the impurities in the terephthalic acid feed present as a result of the not completely removing catalyst metal species added to an oxidation reactor for making crude terephthalic acid.

A molten polyester polymer stream comprises partially aromatic polyester polymers such as those which may be found in the polycondensation zone of a melt phase process for the manufacture of partially aromatic polyester polymers, or those which may be found in solid post melt phase polyester polymers, such as amorphous or crystallized pellets, solid state polymerized polymers, end use applications such as packaging (trays and bottles) and films and sheets, or post consumer recycled polymer. The molten polyester polymer stream typically has an average number of repeat units of 7 or more. and generally up to about 20. In the process of the invention, solid post melt phase polyester polymers are remelted to produce a molten polyester stream. Regardless of the source of polyester polymers, the molten stream contains metal species. Such metal species in the polyester polymers are typically present due to the addition of catalysts used to manufacture terephthalic acid or polyester polymers, or added as reheat agents to the polymer.

Thus, in a melt phase embodiment, reactants may be esterified (direct or ester exchange) in a esterification zone in the presence of metal species to form an oligomer mixture and metal species, and subsequently polycondensing the oligomer mixture in a polycondensation zone to form a molten polyester polymer, optionally in the presence of additional amounts of metal species and/or different types of added metal species, and thereafter solidifying the molten polyester polymer. At any point after the oligomer mixture is formed and before the molten polyester polymer is solidified, at least a portion of the oligomer mixture or molten polyester polymer contacts the porous material in the presence of hydrogen. All of the oligomer mixture stream or the polyester polymer stream present in the melt phase reaction may be brought into contact with the suspension or fixed bed of non-catalytic porous material, or only a portion of any one or both of these streams may be brought into contact with the porous material. Thus, all or a portion of the product of the esterification zone, such as when at least 90% conversion of the reactants to the esterification reactor is obtained; or all or a portion of the stream flowing between the esterification zone and the polycondensation zone; or all or a portion of the stream produced in a prepolymer reaction zone within the polycondensation zone; or all or a portion of the polyester polymer near or after completing polycondensation and molecular weight build up from a finishing reactor; or the finished polyester polymer stream flowing to a machine for solidifying the molten stream into fibers, strands, preforms, or particles, may be brought into contact with the porous material before the stream is solidified.

Since the porous material is effective to remove metal species in the presence of hydrogen, its location may also be dependent upon whether or not one desired to remove the metal species from the stream. For example, in the event that a polycondensation catalyst metal is added to the prepolymerization reactor in a polycondensation zone, the location of contact between a stream and the porous particles is desirably before the point of polycondensation catalyst addition. Locating the porous material prior to the polycondensation zone is applicable to a direct esterification and an ester exchange process, and in the latter process, a further advantage can be had in that the quantity of ester exchange catalyst metal which is usually deactivated before polycondensation can now also be significantly reduced to further avoid the possibility of exchange catalyst activity during polycondensation or to reduce the amount of deactivator added at the conclusion of esterification. Alternatively, if one desires to add a polycondensation catalyst to the esterification zone, the contact location between the stream and porous material may occur between the first esterification reactor and the second or subsequent esterification reactors, followed by adding the polycondensation catalyst to the second or subsequent esterification reactors. The particular location of the porous material in a melt phase polymerization reaction will be dependent largely upon the viscosity limitations of the feed stream and the location where metals are added in the process which one does not desire to remove.

Typical metal species present in an oligomer mixture or polyester polymer composition include cobalt, antimony, titanium, manganese, zinc, calcium, zirconium, copper, iron, nickel, chromium, vanadium, or mixtures thereof. By a metal species is meant the metal present as a compound or alloy, and in any oxidation state, including elemental metal and metal in the +1, +2, +3, +4 oxidation states. In the broadest aspect of the invention, at least a portion of at least one metal species is removed, and is preferably removed onto the non-catalytic porous material. Desirably, the quantity of at least one of the metal species present in an oligomer mixture of polyester polymer is reduced by at least 50%, measured as the difference between the metal species under consideration before contact with the porous material and after contact with the porous material in ppm. Preferably, at least one of said metal species is reduced by at least 75%.

The process of the invention is particularly well adapted to removing metal species from viscous materials. Thus, in one embodiment, the molten polyester polymer stream contacting the porous material has an It.V. of at least 0.1 dL/g, or at least 0.3 dL/g, such as what may be typically experienced in a melt phase process. In a particularly preferred process, there is provided a melt phase reaction in which the amorphous polyester polymer produced from such melt phase process has an It.V. of at least 0.70 dL/g, or at least 0.72 dL/g, or at least 0.75 dL/g. With the removal of at least a portion of metal species from the oligomer mixture or polymer melt, fewer metal atoms are available to catalyze the formation of acetaldehyde or cause the formation of color bodies, thereby allowing one to continue reacting the polymer mixture to higher It.V.'s in the melt phase where the formation of acetaldehyde and color bodies is especially prevalent.

The porous material contacting the oligomer mixture or the molten polyester polymer is non-catalytic, meaning that the porous material is not a hydrogenation catalyst that would hydrogenate aromatic rings to alicyclic rings under the contact conditions. It is undesirable to produce a treated stream containing polymers with repeat units which differ from the repeating units of the feed polyester stream, which would occur if the porous material was, for example, a member of the platinum series of metals. One of the advantages of the invention is that the porous materials can be used as a guard bed to remove metal species from the polyester stream which could possibly poison the stream by converting the repeating units to different species. While the porous material should not be once which is catalytic in the sense of hydrogenating the aromatic rings, the porous materials may, however, accelerate, stabilize, or decelerate the reaction rate or rate at which the molecular weight of the oligomer mixture or molten polyester polymer builds upon contact with the porous material under the reaction conditions. Thus, the non-catalytic porous material may affect the degree of conversion, specificity, and rate, but does not hydrogenate the aromatic rings to any substantial degree. While the porous material is not designed to act as a catalyst, it is recognized that catalytically active impurities may be present on or in the porous material as contaminants in small amounts which could hydrogenate the aromatic rings, and/or the reaction conditions may favor the conversion of aromatic rings to alicyclic rings due to the presence of hydrogen under pressure and high temperature. Thus, up to about 100 ppm of the aromatic rings in the melt phase stream may be hydrogenated after passing the stream over the porous material, which is deemed to be an insubstantial degree of conversion. The method for detecting the presence of hydrogenated rings is by methanolysis; i.e., a sample of the treated oligomer is first degraded by methanolysis and then both GC and LC are used to determine whether dimethyl cyclohexanecarboxylate (DMCD)—the product of the hydrogenated aromatic ring—is present. Other equivalent methods may also be employed.

Typical hydrogenation catalysts are normally found in the platinum family, such as platinum, palladium, iridium, osmium, rhodium, and their binary or tertiary mixture. The porous materials used in the invention, however, are not in the platinum family and do not substantially catalyze the hydrogenation of the polyester polymer aromatic rings under the reaction conditions used to remove the metal species.

Examples of non-catalytic porous materials include carbon, graphite, activated carbon, silicon carbide, alumina, silica and mixtures thereof. The pore volume of the porous materials is suitably 0.1 cc/g to 0.8 cc/g, and suitable pore diameters range from 0.8 nm to 40 nm. Materials having a wide range of surface area are suitable, such as those having a surface area ranging from 0.5 to 2000 $m^2/g$. It is desirable that the surface area of the porous material ranges from 300 to 1100 $m^2/g$ in order to increase the number of metal species atoms adsorbed. At a given surface area, it is desirable to have larger pore diameter and a large pore volume. It is also more desirable to use a particle having a higher surface area. However, in the presence of hydrogen, we have found that porous particles having a small pore diameter within the stated range along with a moderate pore volume and surface area will provide good levels of impurity absorption.

The porous particle size desirably ranges from 2 mm to 50 mm, preferably from 3 mm to 20 mm. In a fixed bed mode, which is preferred, the particle size is generally in the range of 3 to 30 mm. However, the process may also be practiced as a suspended slurry, in which case the particles can be much smaller, in the range of 0.1 mm to 2 mm.

The oligomer mixture or molten polyester stream flows across the porous material. The porous material is slurried or preferably in a fixed bed such that the particles do not flow downstream with the oligomer mixture or polyester stream. The porous particle may be loaded into an existing esterification or polycondensation reactor. Alternatively and preferably, a guard bed may be provided in an integrated melt phase process, or a dedicated stand-alone vessel loaded with the particles is provided into which the oligomer mixture or polyester polymer stream is fed and discharged as a reduced metal stream. The liquid hourly space velocity (LHSV) of the molten polyester stream over the fixed bed is desirably a value ranging from 0.2 to 40 hour$^{-1}$, more preferably from 1 to 15 hour$^{-1}$.

Hydrogen gas is brought into contact with the oligomer mixture or molten polyester polymer stream. Although the porous material is non-catalytic, without the presence of hydrogen, the metal species are not removed. The gas hourly space velocity GHSV of hydrogen over the fixed bed is desirably a value ranging from 5 to 1000 hour$^{-1}$, preferably from 100 to 400 hour$^{-1}$. Without being bound to a theory, it is believed that the metal species are captured on the porous support because hydrogen reduced the metal cation to a lower oxidation state or to elemental metal, thereby providing an atom having a larger atomic radius and enabling the support to capture the larger atom within its pores. Whatever the mechanism, however, we have found that the porous support is effective in the presence of hydrogen to capture metal species impurities in the feed stream.

The hydrogen gas fed to the porous particle bed or the gaseous atmosphere in contact with the stream and porous particle bed has a higher volume % of hydrogen gas than does air. The hydrogen gas fed to the porous particle bed, or the gas composition contacting the stream and porous particles, is preferably at a hydrogen concentration of at least 10 vol. % hydrogen, or at least 20 vol % hydrogen, or at least 50 vol % hydrogen, and more preferably at least 80 vol % hydrogen or at least 90 vol % hydrogen and most preferably about 100 vol %. Suitable hydrogen partial pressure within the vessel or zone containing the porous material ranges from 1 to 10 kg/cm$^2$ when calculated at 250° C. and 150 psi gauge pressure.

The pressure on the molten polyester stream when contacting the porous material in the presence of hydrogen is positive, and desirably ranges from 10 to 2000 psig, and more typically from 50 to 150 psig. The temperature of the oligomer mixture or the polyester stream in the presence of hydrogen ranges from 150 to 300° C., and more typically from 200 to 280° C.

The process of the invention is effective to remove at least a portion of at least one of the metal species present in the oligomer mixture of molten polymer stream to produce a reduced metal stream. In one embodiment, at least one of the metal species present is reduced by at least 50%, and preferably by at least 75%. In another embodiment of the invention, the oligomer mixture or molten polyester stream contains cobalt as the metal species in one or more oxidation states, and the amount of cobalt is reduced by at least 50% to less than 20 ppm. In another alternative embodiment, or in addition, after contact with the porous material, the reduced metal stream contains less than 5 ppm titanium, less than 20 ppm zinc, less than 20 ppm manganese, less than 20 ppm calcium, and less than 20 ppm magnesium. Other metal species which may be present in the polyester polymer composition or in the oligomer mixture that can be effectively reduced in amount by the process of the invention include zirconium, chromium, iron, nickel, and copper. The oligomer mixture and the molten polyester polymer stream contacting the porous material contains less than 10 ppm germanium, and is preferably free of germanium metal species.

In yet another embodiment, the process of the invention is effective to reduce the amount of each metal present in the oligomer mixture or the molten polyester polymer in an amount of over 10 ppm by at least 25%, or at least 50%, and most preferably by at least 65%.

The process can be practice continuously, in a batch mode, or in a semi-batch mode. When the capacity of the porous material to adsorb the metal species drops to an undesirable level, the metal may be recovered from the porous material. Techniques for recovering the metal species include metal refining, pyrometallurgy, hydrometallurgy, and electrometallurgy, as described in Ullmann's Encyclopedia of Industrial Chemistry, 5$^{th}$ Edition, Volume 16, pp 375-387, VCH, 1990.

There is also now provided unique compositions comprising partially aromatic polyester polymers which are amorphous or partially crystallized. There is provided, in one embodiment, a composition comprising partially aromatic polyester polymers having an It.V. of at least 0.50 produced in a direct esterification melt phase process, antimony present in an amount of greater than 0 and less than 50 ppm antimony, preferably less than 30 ppm, and cobalt in an amount ranging from 0 to less than 40 ppm, preferably less than 25 ppm. In this embodiment, antimony atoms are present, but are present in the stated amounts, while the amount of cobalt may be zero either because it was not added to the melt phase or it is totally removed.

The polymer composition may be solid or molten. In the case of a solid, the polyester polymers in the composition may be amorphous, which is the natural state of the polymer product solidified from the melt phase process or from an injection molding machine to make bottle preforms, or the polymers may be partially crystallized. Partial crystallinity may be imparted to the polyester polymers in the composition by isolating the amorphous polymer as a solid, followed by applying conventional crystallization techniques. It is not always the case, however, that the melt phase product is isolated as an amorphous solid polymer. For example, the melt phase product may be fed directly to an underwater cutter and immediately crystallized underwater without exposing the cut polymer to air. Alternatively, the underwater cut polymer may be rapidly dried and crystallized in air by the latent heat within the cut particles before the particles have a chance to fall below the Tg of the polymer. Thus, the stated amounts of metal species may also be present in a crystalline polymer. The degree of crystallinity should be at least 25%, or at least 30%, or at least 35%, or at least 40%.

The polymer composition may also be molten. A molten composition is present in a melt phase process in which the It.V. of the polymer equals or exceed 0.50 dL/g, in a melt to preform process, or in a melt to chip process. In each case, the molten stream contains the stated amounts of metal species.

The polyester polymer may contain optional metals. Such metals and their amounts are less than 5 ppm titanium, less than 20 ppm zinc, less than 20 ppm manganese, less than 20 ppm calcium, less than 20 ppm magnesium, and/or less than 10 ppm germanium, more preferably less than 5 ppm germanium. In this embodiment, one or more of the metals may optionally be absent such that the amount is zero, but preferably, at least one of the aforesaid metals is present in an amount of greater than 0.

The polyester polymer product preferably also has an It.V. greater than 0.70 dL/g, or greater than 0.72 dL/g. This It.V. is obtained without solid state polymerization techniques typically used to advance the molecular weight of the polymers in the solid state. The It.V. is desirably obtained from the melt phase process for the manufacture of the polyester polymers.

In another embodiment, there is provided a composition comprising partially aromatic polyester polymers having an It.V. of at least 0.50 produced in an ester exchange melt phase process, titanium present in an amount of greater than 0 and less than 5 ppm titanium, and less than 10 ppm manganese, preferably less than 7 ppm manganese. In this embodiment, titanium is present but in an amount of less than 5 ppm, preferably 3 ppm or less, and the amount of manganese may be zero, either because is was not ever added or because it was removed totally in the process. As in the embodiment above, this polymer composition may be solid or molten, amorphous or crystalline, and may have an It.V. of at least 0.70 dL/g or at least 0.72 dL/g.

In each case, the partially aromatic polyester polymers are thermoplastic homopolymers, or thermoplastic copolymers obtained by the addition of modifier compound to provide more than two types or repeating units. A thermoplastic polymer is distinguishable from liquid crystal polymers and thermosetting polymers in that thermoplastic polymers have no ordered structure while in the liquid (melt) phase, they can be remelted and reshaped into a molded article, and liquid crystal polymers and thermosetting polymers are unsuitable for the intended applications such as packaging or stretching in a mold to make a container.

The partially aromatic polyester polymer contains residues of aromatic rings and contains polyester linkages. Desirably, the partially aromatic polyester polymer contains alkylene terephthalate or alkylene naphthalate repeating units in the polymer chain. More preferred are polyester polymers which comprise:
(a) a carboxylic acid component comprising at least 80 mole % of the residues of terephthalic acid, derivates of terephthalic acid, naphthalene-2,6-dicarboxylic acid, derivatives of naphthalene-2,6-dicarboxylic acid, or mixtures thereof, and
(b) a hydroxyl component comprising at least 60 mole %, or at least 80 mole %, of the residues of ethylene glycol or propane diol,
based on 100 mole percent of carboxylic acid component residues and 100 mole percent of hydroxyl component residues in the polyester polymer.

Typically, polyesters such as polyethylene terephthalate are made by reacting a diol such as ethylene glycol with a dicarboxylic acid as the free acid or its dimethyl ester to produce an ester monomer and/or oligomers, which are then polycondensed to produce the polyester. More than one compound containing carboxylic acid group(s) or derivative(s) thereof can be reacted during the process. All the compounds containing carboxylic acid group(s) or derivative(s) thereof that are in the product comprise the "carboxylic acid component." The mole % of all the compounds containing carboxylic acid group(s) or derivative(s) thereof that are in the product add up to 100. The "residues" of compound(s) containing carboxylic acid group(s) or derivative(s) thereof that are in the product refers to the portion of said compound(s) which remains in the oligomer and/or polymer chain after the condensation reaction with a compound(s) containing hydroxyl group(s).

More than one compound containing hydroxyl group(s) or derivatives thereof can become part of the polyester polymer product(s). All the compounds containing hydroxyl group(s) or derivatives thereof that become part of said product(s) comprise the hydroxyl component. The mole % of all the compounds containing hydroxyl group(s) or derivatives thereof that become part of said product(s) add up to 100. The residues of hydroxyl functional compound(s) or derivatives thereof that become part of said product refers to the portion of said compound(s) which remains in said product after said compound(s) is condensed with a compound(s) containing carboxylic acid group(s) or derivative(s) thereof and further polycondensed with polyester polymer chains of varying length.

The mole % of the hydroxyl residues and carboxylic acid residues in the product(s) can be determined by proton NMR.

In another embodiment, the polyester polymer comprises:
(a) a carboxylic acid component comprising at least 90 mole %, or at least 92 mole %, or at least 96 mole % of the residues of terephthalic acid, derivates of terephthalic acid, naphthalene-2,6-dicarboxylic acid, derivatives of naphthalene-2,6-dicarboxylic acid, or mixtures thereof, and
(b) a hydroxyl component comprising at least 90 mole %, or at least 92 mole %, or at least 96 mole % of the residues of ethylene glycol, based on 100 mole percent of the carboxylic acid component residues and 100 mole percent of the hydroxyl component residues in the polyester polymer.

The reaction of the carboxylic acid component with the hydroxyl component during the preparation of the polyester polymer is not restricted to the stated mole percentages since one may utilize a large excess of the hydroxyl component if desired, e.g. on the order of up to 200 mole % relative to the 100 mole % of carboxylic acid component used. The polyester polymer made by the reaction will, however, contain the stated amounts of aromatic dicarboxylic acid residues and ethylene glycol residues.

Derivatives of terephthalic acid and naphthalane dicarboxylic acid include $C_1$-$C_4$ dialkylterephthalates and $C_1$-$C_4$ dialkylnaphthalates, such as dimethylterephthalate and dimethylnaphthalate.

In addition to a diacid component of terephthalic acid, derivates of terephthalic acid, naphthalene-2,6-dicarboxylic acid, derivatives of naphthalene-2,6-dicarboxylic acid, or mixtures thereof, the carboxylic acid component(s) of the present polyester may include one or more additional modifier carboxylic acid compounds. Such additional modifier carboxylic acid compounds include mono-carboxylic acid compounds, dicarboxylic acid compounds, and compounds with a higher number of carboxylic acid groups. Examples include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. More specific examples of modifier dicarboxylic acids useful as an acid component(s) are phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like, with isophthalic acid, naphthalene-2,6-dicarboxylic acid, and cyclohexanedicarboxylic acid being most preferable. It should be understood that use of the corresponding acid anhydrides, esters, and acid chlorides of these acids is included in the term "carboxylic acid". It is also possible for tricarboxyl compounds and compounds with a higher number of carboxylic acid groups to modify the polyester.

In addition to a hydroxyl component comprising ethylene glycol, the hydroxyl component of the present polyester may include additional modifier mono-ols, diols, or compounds with a higher number of hydroxyl groups. Examples of modifier hydroxyl compounds include cycloaliphatic diols preferably having 6 to 20 carbon atoms and/or aliphatic diols preferably having 3 to 20 carbon atoms. More specific examples of such diols include diethylene glycol; triethylene glycol; 1,4-cyclohexanedimethanol; propane-1,3-diol; butane-1,4-diol; pentane-1,5-diol; hexane-1,6-diol; 3-methylpentanediol-(2,4); 2-methylpentanediol-(1,4); 2,2,4-trimethylpentane-diol-(1,3); 2,5-ethylhexanediol-(1,3); 2,2-diethyl propane-diol-(1, 3); hexanediol-(1,3); 1,4-di-(hydroxyethoxy)-benzene; 2,2-bis-(4-hydroxycyclohexyl)-propane;

2,4-dihydroxy-1,1,3,3-tetramethyl-cyclobutane; 2,2-bis-(3-hydroxyethoxyphenyl)-propane; and 2,2-bis-(4-hydroxypropoxyphenyl)-propane.

As modifiers, the polyester polymers may contain comonomers such as isophthalic acid, naphthalane dicarboxylic acid, cyclohexanedimethanol, and diethylene glycol.

The polyester pellet compositions may include blends of polyalkylene terephthalates and/or polyalkylene naphthalates along with other thermoplastic polymers such as polycarbonate (PC) and polyamides. It is preferred that the polyester composition should comprise a majority of the polyester polymers, more preferably in an amount of at least 80 wt. %, or at least 95 wt. %, and most preferably 100 wt. %, based on the weight of all thermoplastic polymers (excluding fillers, inorganic compounds or particles, fibers, impact modifiers, or other polymers which may form a discontinuous phase). It is also preferred that the polyester polymers do not contain any fillers, fibers, or impact modifiers or other polymers which form a discontinuous phase.

Compositions of the invention in the form of solid particles may be fed to an extruder suitable to make containers or sheet. The particles may be:

A) dried in a drying zone to produce dried particles;
B) introduced into a melting zone;
C) melted in a melt processing zone, and
D) formed into an article such as a preform or tray.

Once the particles have been dried, they are introduced into a melt processing zone to form molten polyester polymer, followed by forming an article such as a sheet or a molded part. Any conventional technique used to melt particles and form articles therefrom can be used. Suitable melt processing zones include extruders equipped with a barrel, one or more screws in the barrel, a motor to turn the screw, heating elements to direct heat through the barrel to the particles, and a die plate through which the molten polymer is forced. The die may be a sheet die, optionally connected to a thermoforming mold. Another melt processing zone is an injection molding machine equipped with the same features, except that a nozzle is used instead of a die through which the polymer is forced into a runner system that directs the polymer into one or more mold cavities. An example of a molded part includes a bottle preform (parison).

In the melt processing zone to produce an article, or in the melt-phase process for making the polyester polymer, other components can be added to the composition of the present invention to enhance the performance properties of the polyester polymer. These components may be added neat to the bulk polyester, may added as a dispersion in a liquid carrier or may be added to the bulk polyester as a polyester concentrate containing at least about 0.5 wt. % of the component in the polyester let down into the bulk polyester.

The types of suitable additives which can be added to the melt processing zone or to the melt phase reaction or to solid compositions as a particle/particle blend include crystallization aids, impact modifiers, surface lubricants, stabilizers, denesting agents, antioxidants, ultraviolet light absorbing agents, metal deactivators, colorants, nucleating agents, acetaldehyde lowering compounds, reheat rate enhancing aids, sticky bottle additives such as talc, and fillers and the like can be included. The resin may also contain small amounts of branching agents such as trifunctional or tetrafunctional comonomers such as trimellitic anhydride, trimethylol propane, pyromellitic dianhydride, pentaerythritol, and other polyester forming polyacids or polyols generally known in the art. All of these additives and many others and their use are well known in the art and do not require extensive discussion. Any of these compounds can be used in the present composition.

In each of these embodiments, the articles of manufacture are not limited, and include sheet and bottle preforms. The bottle preforms can be stretch blow molded into bottles by conventional processes. Thus, there is also provided in an embodiment the bottles made from the spheroids of the invention, or made by any of the processes of the invention, or made by any conventional melt processing technique.

Not only may containers be made from compositions made according to the process of this invention, but other items such as sheet, film, bottles, trays, other packaging, rods, tubes, lids, filaments and fibers, and other molded articles may also be manufactured using the polyester compositions of the invention. Made from polyethylene terephthalate polymers, beverage bottles suitable for holding water or carbonated beverages, and heat set beverage bottles suitable for holding beverages which are hot filled into the bottle are examples of the types of bottles which are made from the crystallized spheroids of the invention.

The invention may now be further understood by reference to the following non-limiting illustrative examples.

FIG. 1 is a schematic process flow diagram illustrating one embodiment of the invention in which the fixed bed of porous particles is loaded in a dedicated stand alone vessel (V12) as part of a melt phase process for the manufacture of the compositions of the invention. The zone V11 represents an esterification zone in which a diacid and diol, for example, terephthalic acid (TPA) and ethylene glycol (EG), are esterified in one or multiple vessels, such as continuous stirred tank reactors or a pipe reactor. The product of the esterification zone, such as an oligomer mixture stream, is delivered to the purification vessel V12 via pipe C11 either through gravity or a pump at a LHSV ranging 1 to 15. A heat exchanger may be included in the design of C11. If the temperature within the V11 vessel is about same as the temperature in the V12 vessel, a heat exchanger may not be needed. However, C11 should be thermally insulated so that the esterification product will not be solidified in C11 in route from V11 to V12.

Hydrogen is introduced to V12 via C12 pipe by a compressor at a GHSV ranging from 100 to 400. V12 is packed with the porous materials pellets sized from 0.5 mm to 3 mm and maintained at temperature within a range of 200° C. to 280° C. and pressure of 50 psig to 150 psig.

The hydrotreated PET oligomer is discharged from V12 and introduced to a polycondensation zone V13 via pipe C13 by either gravity or a pump. The block V13 represents a polycondensation process to polyester (PET) and the final product is discharged via C15 through a pump or extruder. As a standard process practice, C13 may be equipped with thermal insulating materials and heat exchanger if needed, and installed with various valves such as control valve to control the pressure of V12. A gas-liquid separator may be located between C13 and C14, and preferably between V12 and V13. The gas effluent from V12 may be recycled via C14 and C12 back to V12 or not recycled, which may depend on the process economics or the purity requirements of the V12 hydrogen feed. A condenser or separation column may be used to remove liquid moieties from the recycled gas stream.

In comparison with FIG. 1a, FIG. 1b shows another configuration of the process in which the esterification products from V11 may be split into two streams; one oligomer stream is taken as a side draw and introduced to V12 for hydrotreating and the other stream introduced directly to V13 for polycondensation. The split ratio may be determined according to the desired properties of both the feed and the product required for the ultimate application.

Figure 2:
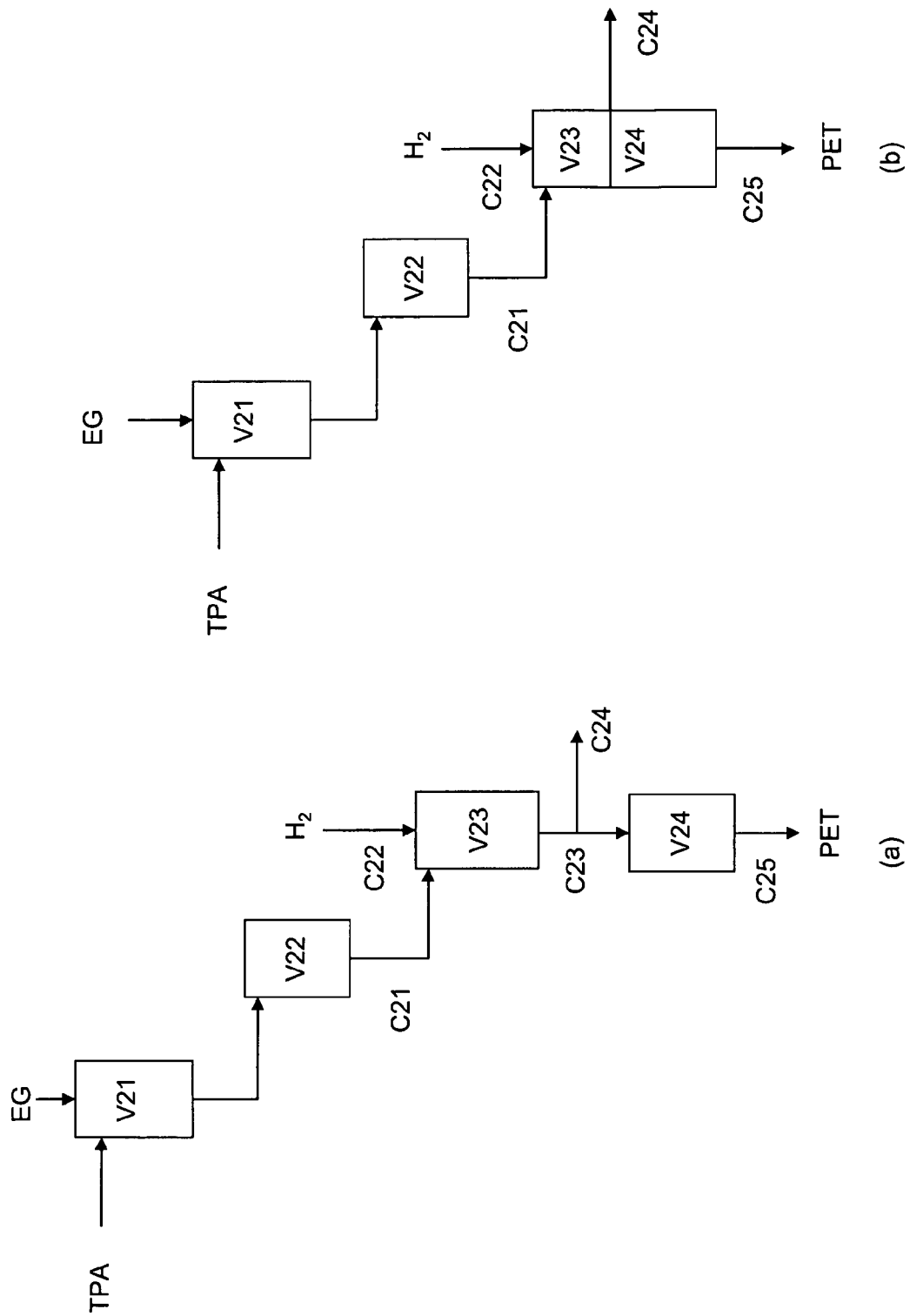
FIG. 2 is a schematic process flow diagram illustrating hydrotreating a molten polyester polymer stream, in which zone V23 and the zone V24 may be operated in separate units (FIG. 2a) or in an integrated unit with the high polymerizer vessel split into different zones within the same vessel (FIG. 2b).

FIG. 2 is a schematic process flow diagram illustrating hydrotreating a molten polyester polymer stream. The zone V21 represents an esterification zone as described with respect to V11 in FIG. 1. The oligomer mixture made in the esterification zone is fed to zone V22, a prepolymer zone, and then introduced via C21 to the zone V23 for hydrotreating. The operation condition surrounding V23 may be within the same ranges described in FIG. 1 with respect to V12, but at a higher temperature and lower pressure to simulate the operating conditions of the prepolymer reaction zone V22 or the finishing zone V24. The treated prepolymer undergoes further polycondensation or finishing in a one or a number of finishing vessels or high polymerizer in zone V24 and the final product is discharged via C25. As FIG. 2 shows, the zone V23 and the zone V24 may be operated in separate units (FIG. 2a) or in an integrated unit with the high polymerizer vessel split into different zones within the same vessel. (FIG. 2b). C24 is the hydrogen gas off-take from a gas separator located between V23 and V24 as in FIG. 2a, or a gas discharge from the hydrotreating zone within the high polymerizer.

Figure 3:
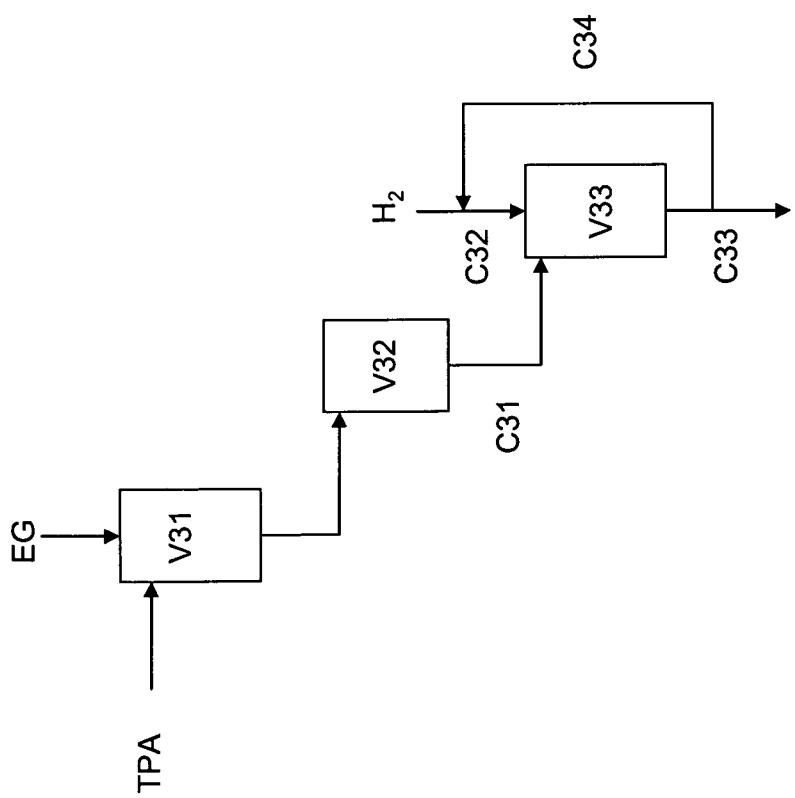
FIG. 3 illustrates a process flow diagram in which the molten polyester stream from a polycondensation zone is used as the feed to a fixed particle bed.

FIG. 3 illustrates a process flow diagram in which the molten polyester stream from a polycondensation zone (V32) is used as the feed to the fixed particle bed. The zone V31 represents a process of esterification and oligomerization as described in FIG. 1. The zone V32 represents a poly-condensation process as described in FIG. 1. The molten polyester stream having an It.V. of at least 0.55 from V32 is introduced to V33 for hydrotreating via C31. C34 is the off-take of hydrogen gas from the hydrotreating zone V33 which is recycled directly or indirectly to C32 hydrogen gas feed.

Figure 4:
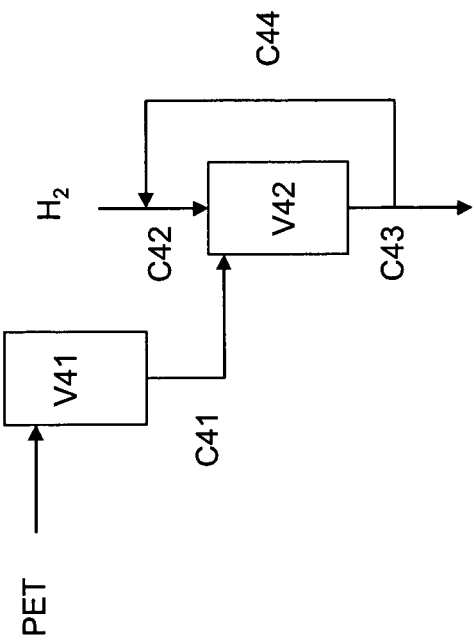
FIG. 4 illustrates a process flow diagram in which amorphous solid polyester polymers or crystallized polyester polymers or solid state polymerized polyester polymers, either in the form of virgin particles, scrap, or post consumer recycle polymer, is melted, or diluted or de-polymerized, and fed to a vessel loaded with the porous particles to reduce the metal content of the polymer stream.

FIG. 4 illustrates a process flow diagram in which amorphous solid polyester polymers or crystallized polyester polymers or solid state polymerized polyester polymers, either in the form of virgin particles, scrap, or post consumer recycle polymer, is melted, or diluted with a solvent such as ethylene glycol, or de-polymerized, and fed to a vessel loaded with the porous particles to reduce the metal content of the polymer stream. A PET is fed to the zone V41 in which it is melted, or diluted with a solvent, or de-polymerized mechanically or chemically (such as methanolysis). Then, it is introduced via C41 to the zone V42 for hydrotreating in a vessel in which hydrogen gas is fed via line C42 and optionally recycled back directly or indirectly to the hydrotreating vessel V42 via line C44 from the discharge line C43.

The following working examples demonstrate the removal of a variety of metal species from molten polyester polymers by flowing the molten streams over fixed beds of various non-catalytic porous materials.

COMPARATIVE EXAMPLE 1

78 g of carbon granules (¼" in diameter) having a surface area of 1100 m²/g, a median pore diameter of 3.1 nm, and pore volume of 0.3 cc/g commercially available from Engelhard Corporation was loaded in a 1" ID stainless steel reactor. Then the reactor was heated to 260° C. at a heating rate of 10° C./minute in flowing nitrogen at a rate of 60 GHSV and gradually pressurized to 150 psig. Then a PET pre-polymer was prepared by the reaction of ethylene glycol and terephthalic acid in a 1.3/1 mole ratio at 260° C. for 2 hours. The prepared oligomer had a degree of polymerization of 3.8, and contained 54.4 ppm cobalt. It was fed to the reactor with an extruding pump at a LHSV of 1.8. Cobalt concentration in the reactor effluent was determined with X-ray fluorescence spectroscopy and was found to be the same as the concentration of the starting material. Without the presence of hydrogen, cobalt could not be removed.

EXAMPLES 2-5

78 g of carbon, the same as used in Example 1, was loaded in a 1" ID stainless steel reactor. To the reactor was added a flow of nitrogen gas at a rate of 60 GHSV at ambient temperature for 30 minutes. Then, the gas flow was switched from nitrogen to hydrogen gas, comprised of an excess of 90 vol % hydrogen, at the same rate. Then, the reactor was heated to 260° C. at a heating rate of 10° C./minute in flowing hydrogen gas. Then, the reactor was gradually pressurized to 50 psig with hydrogen. Then a PET pre-polymer containing 54.4 ppm cobalt was fed to the reactor with an extruding pump at a LHSV of 1.8. Cobalt concentration in the reactor effluent was decreased to 4.4 ppm from 54.5 ppm in the starting material. The presence of hydrogen and carbon effectively removed cobalt from the molten polyester polymer stream.

| Examples | Temperature/° C. | Pressure/psig | Co in the effluent/ppm |
|---|---|---|---|
| 2 | 260 | 50 | 4.4 |
| 3 | 260 | 200 | 1.9 |
| 4 | 280 | 200 | 1.8 |
| 5 | 280 | 50 | 3.6 |

EXAMPLES 6-9

100 g of silicon carbide pellets (⅛" in diameter) having a surface area of 1 m²/g and average pore diameter of 5.5 nm (Engelhard Corporation) was loaded in a 1" ID stainless steel reactor. Then the reactor was heated to 250° C. in flowing nitrogen and then hydrogen was added at a rate of 60 GHSV from the same source as Example 2. Then, the reactor was gradually pressurized to 100 psig. Then a PET pre-polymer containing 54.4 ppm cobalt was fed to the reactor with an extruding pump at a LHSV of 1.8. Cobalt concentration in the reactor effluent was decreased to 2.5 ppm from 54.5 ppm in the starting material.

| Examples | Temperature/° C. | Pressure/psig | Co in the effluent/ppm |
|---|---|---|---|
| 6 | 250 | 100 | 2.5 |
| 7 | 260 | 100 | 2.4 |
| 8 | 270 | 150 | 2.0 |
| 9 | 270 | 200 | 1.0 |

EXAMPLES 10-12

85 g of alumina having a surface area of 100 m²/g, pore volume of 0.5 cc/g, and pore diameter 19.3 nm (Engelhard Corporation) was loaded in a 1" ID stainless steel reactor. Then the reactor was heated to 260° C. in flowing nitrogen and then hydrogen added at a rate of 60 GHSV from the same source as Example 2. Then, the reactor was gradually pressurized to 150 psig. Then a PET pre-polymer containing 54.4 ppm cobalt was fed to the reactor with an extruding pump at a LHSV of 1.8. Cobalt concentration in the reactor effluent was decreased to 13.4 ppm from 54.5 ppm in the starting material.

| Examples | Temperature/° C. | Pressure/psig | Co in the effluent/ppm |
|---|---|---|---|
| 10 | 260 | 150 | 13.4 |
| 11 | 260 | 90 | 13.6 |
| 12 | 260 | 50 | 17.5 |

EXAMPLES 13-15

45 g of graphite pellets (1/16" in diameter) having a surface area of 620 m²/g, pore volume of 0.4 cc/g, and pore diameter of 3.2 nm (Engelhard Corporation) was loaded in a 1" ID stainless steel reactor. Then the reactor was heated to 260° C. in flowing nitrogen and then hydrogen at a rate of 60 GHSV from the same source as Example 2. Then, the reactor was gradually pressurized to 150 psig. Then a PET pre-polymer containing 54.4 ppm cobalt was fed to the reactor with an extruding pump at a LHSV of 1.8. Cobalt concentration in the reactor effluent was decreased to 9.0 ppm from 54.5 ppm in the starting material.

| Examples | Temperature/° C. | Pressure/psig | Co in the effluent/ppm |
|---|---|---|---|
| 13 | 260 | 150 | 9.0 |
| 14 | 270 | 150 | 11.0 |
| 15 | 270 | 100 | 15.0 |

EXAMPLE 16

45 g of graphite, the same as described in Examples 13-15, was loaded in a 1" ID stainless steel reactor. Then the reactor was heated to 260° C. in flowing nitrogen and then hydrogen added at a rate of 60 GHSV from the same source as Example 2. Then, the reactor was gradually pressurized to 150 psig. Then a PET pre-polymer containing 76 ppm antimony was fed to the reactor with an extruding pump at a LHSV of 1.8. Antimony concentration in the reactor effluent was decreased to 18 ppm from 76 ppm in the starting material.

What we claim is:

1. A polyester composition in the form of cut particles, comprising:
    a partially aromatic polymer comprising repeating units of alkylene terephthalate or alkylene naphthalate, having an It.V. of greater than 0.72 dL/g, produced in a direct esterification melt phase process without solid state polymerization, cutting the composition into cut particles, and subsequently crystallizing by latent heat within the cut particles;
    about 0 ppm titanium;
    from greater than 0 to less than 30 ppm antimony;
    less than 5 ppm germanium; and
    from 11.0 ppm to less than 40 ppm cobalt, and
    having a degree of crystallinity of at least 25%.
2. The composition of claim 1, further comprising:
    less than 20 ppm zinc;
    less than 20 ppm manganese;
    less than 20 ppm calcium; and
    less than 20 ppm magnesium.
3. The composition of claim 1, comprising:
    from 0 ppm to less than 20 ppm zinc.
4. The composition of claim 1, comprising:
    from 0 ppm to less than 20 ppm manganese.
5. The composition of claim 1, comprising:
    from 0 ppm to less than 20 ppm calcium.
6. The composition of claim 1, comprising:
    from 0 ppm to less than 20 ppm magnesium.
7. The composition of claim 1, comprising:
    from greater than 0 ppm to less than 20 ppm zinc.
8. The composition of claim 1, comprising:
    from greater than 0 ppm to less than 20 ppm manganese.
9. The composition of claim 7, comprising:
    from greater than 0 ppm to less than 20 ppm manganese.
10. The composition of claim 1, comprising:
    from greater than 0 ppm to less than 20 ppm calcium.
11. The composition of claim 7, comprising:
    from greater than 0 ppm to less than 20 ppm calcium.
12. The composition of claim 9, comprising:
    from greater than 0 ppm to less than 20 ppm calcium.
13. The composition of claim 1, comprising:
    from greater than 0 ppm to less than 20ppm magnesium.
14. The composition of claim 7, comprising:
    from greater than 0ppm to less than 20 ppm magnesium.
15. The composition of claim 9, comprising:
    from greater than 0 ppm to less than 20 ppm magnesium.
16. The composition of claim 12, comprising:
    from greater than 0 ppm to less than 20 ppm magnesium.
17. The composition of claim 1, comprising:
    less than 25 ppm Co.
18. The composition of claim 1, having a degree of crystallinity of at least 30%.
19. The composition of claim 1, having a degree of crystallinity of at least 35%.
20. The composition of claim 1, having a degree of crystallinity of at least 40%.
21. The composition of claim 1, comprising:
    less than 7 ppm manganese.
22. The composition of claim 1, comprising:
    less than 5 ppm manganese
23. The composition of claim 2, comprising:
    less than 7 ppm manganese.
24. The composition of claim 3, comprising:
    less than 7 ppm manganese.
25. The composition of claim 1, wherein the partially aromatic polymer comprises a carboxylic acid component comprising at least 80 mole % of terephthalate, 2,6-naphthalate, or mixtures thereof, based on 100 mole percent of carboxylic acid component residues in the partially aromatic polymer.
26. The composition of claim 1, wherein the partially aromatic polymer comprises a hydroxyl component comprising at least 60 mole % of ethylene glycol or propane diol, based on 100 mole percent of hydroxyl component residues in the partially aromatic polymer.
27. The composition of claim 17, wherein the partially aromatic polymer comprises a hydroxyl component comprising at least 60 mole % of ethylene glycol or propane diol, based on 100 mole percent of hydroxyl component residues in the partially aromatic polymer.

* * * * *